US011083986B2

(12) United States Patent
Gaplikow et al.

(10) Patent No.: US 11,083,986 B2
(45) Date of Patent: Aug. 10, 2021

(54) REFRIGERATION APPLIANCE AND FILTER CARTRIDGE FOR SAME

(71) Applicant: BSH HAUSGERAETE GMBH, Munich (DE)

(72) Inventors: Eugen Gaplikow, Bubesheim (DE); Karl-Friedrich Laible, Langenau (DE)

(73) Assignee: BSH Hausgeraete GmbH, Munich (DE)

( * ) Notice: Subject to any disclaimer, the term of this patent is extended or adjusted under 35 U.S.C. 154(b) by 881 days.

(21) Appl. No.: 15/527,759

(22) PCT Filed: Nov. 17, 2015

(86) PCT No.: PCT/EP2015/076875
§ 371 (c)(1),
(2) Date: May 18, 2017

(87) PCT Pub. No.: WO2016/079149
PCT Pub. Date: May 26, 2016

(65) Prior Publication Data
US 2017/0312666 A1  Nov. 2, 2017

(30) Foreign Application Priority Data
Nov. 19, 2014  (DE) .......................... 102014223648.7

(51) Int. Cl.
*B01D 29/11*  (2006.01)
*B01D 29/96*  (2006.01)
(Continued)

(52) U.S. Cl.
CPC ............ *B01D 35/30* (2013.01); *B01D 29/114* (2013.01); *B01D 29/23* (2013.01); *B01D 29/96* (2013.01);
(Continued)

(58) Field of Classification Search
CPC ...... B01D 35/30; B01D 29/96; B01D 29/114; B01D 2201/4076; B01D 2201/52;
(Continued)

(56) References Cited

U.S. PATENT DOCUMENTS

| 5,709,795 A | 1/1998 | Park et al. |
| 6,006,924 A * | 12/1999 | Sandford ............... B01D 29/15 |
| | | 210/440 |

(Continued)

FOREIGN PATENT DOCUMENTS

| DE | 102005057132 A1 | 6/2007 |
| EP | 2435156 A1 | 4/2012 |

(Continued)

OTHER PUBLICATIONS

"Abutment." Merriam-Webster.com Dictionary, Merriam-Webster, https://www.merriam-webster.com/dictionary/abutment. Accessed Jun. 29, 2020. (Year: 2020).*

(Continued)

*Primary Examiner* — Lucas A Stelling
*Assistant Examiner* — Angel Olivera
(74) *Attorney, Agent, or Firm* — Laurence A. Greenberg; Werner H. Stemer; Ralph E. Locher

(57) ABSTRACT

A filter cartridge for a domestic cooling appliance includes a beaker-shaped housing which is provided at an open end with a coupling for securing to a filter head, and a particle filter insert which is received in the housing. The particle filter insert is guided movably along an axis of the housing between an abutment position, in which it is embedded completely in the housing, and a position in which it at least partially protrudes from the housing. A domestic refrigeration appliance having the filter cartridge is also provided.

12 Claims, 3 Drawing Sheets

(51) Int. Cl.
- *B01D 35/30* (2006.01)
- *F25D 23/12* (2006.01)
- *B01D 29/23* (2006.01)
- *C02F 1/00* (2006.01)

(52) U.S. Cl.
CPC ............ *C02F 1/003* (2013.01); *F25D 23/126* (2013.01); *B01D 2201/0423* (2013.01); *B01D 2201/295* (2013.01); *B01D 2201/305* (2013.01); *B01D 2201/4046* (2013.01); *B01D 2201/4076* (2013.01); *C02F 2201/006* (2013.01); *C02F 2307/10* (2013.01); *C02F 2307/12* (2013.01); *F25D 2323/121* (2013.01)

(58) Field of Classification Search
CPC ........ B01D 2201/295; B01D 2201/305; B01D 2201/4084; B01D 2201/4046; B01D 29/23; B01D 2201/0423; F25D 23/126; F25D 2323/121; C02F 1/003; C02F 2307/10; C02F 2201/006; C02F 2307/12
See application file for complete search history.

(56) References Cited

U.S. PATENT DOCUMENTS

| | | |
|---|---|---|
| 6,303,031 B1 | 10/2001 | Senner |
| 8,038,873 B2 | 10/2011 | Buchstab et al. |
| 2001/0030148 A1* | 10/2001 | Knight ................... F02M 37/26 |
| | | 210/130 |
| 2004/0211717 A1* | 10/2004 | Mitchell .............. B01D 35/153 |
| | | 210/235 |
| 2012/0193281 A1 | 8/2012 | Zhu et al. |

FOREIGN PATENT DOCUMENTS

| | | |
|---|---|---|
| WO | 2010136027 A1 | 12/2010 |
| WO | 2014041432 A2 | 3/2014 |

OTHER PUBLICATIONS

"Abut." Merriam-Webster.com Dictionary, Merriam-Webster, https://www.merriam-webster.com/dictionary/abut. Accessed Jun. 29, 2020. (Year: 2020).*

* cited by examiner

REFRIGERATION APPLIANCE AND FILTER CARTRIDGE FOR SAME

BACKGROUND OF THE INVENTION

Field of the Invention

The present invention relates to a filter cartridge as well as to a refrigeration appliance, in particular a domestic refrigeration appliance, in which a water connection and a water consumer, such as for instance a cold water dispenser or an ice maker, are connected by way of a filter cartridge.

Water filters are used in refrigeration appliances in most cases to free mains water, supplied to the consumer, of chlorine or other carriers of unwanted flavor or fragrance. The adsorbing filter materials used for this have a limited intake capacity so that the filter has to be replaced from time to time. Replacement of the filters is associated with costs, and the willingness of the user to bear these costs is naturally associated with the extent to which said user is bothered by strange flavors or fragrances in the mains water.

A refrigeration appliance in which a water filter can be replaced by a plug without any filter function is known from U.S. Pat. No. 6,303,031 B1.

DE 10 2005 057 132 A1 discloses a refrigeration appliance, in which an adsorption filter can be replaced with a particle filter. The particle filter has no influence on the flavor and fragrance of the water but instead protects the valves of the downstream consumers in particular from particles which could prevent a proper closure of the valves or damage the valves.

The extent to which particles accumulate in this conventional particle filter causes the flow resistance to increase and thus negatively affects the function of the consumer. Therefore if the particle filter is replaced, this is once again associated with costs for the user.

SUMMARY OF THE INVENTION

The object of the invention is to specify a refrigeration appliance or a filter cartridge, which render superfluous the replacement of the filter cartridge or at least considerably extend the service life of a filter cartridge.

The object is achieved on the one hand with a filter cartridge having a beaker-shaped housing which is provided at an open end with a coupling for securing to a filter head, and a particle filter insert which is received in the housing and is guided movably along an axis of the housing between an abutment position, in which it is embedded completely in the housing, and a position in which it at least partially protrudes from the housing.

While, in the abutment position embedded in the housing, particles retained on the particle filter insert are concealed in the inside of the housing and are at best flushed out with difficulty, the repositioning of the particle filter insert into the position that protrudes from the housing is already adequate to position the particle filter insert thus far that it can be rinsed through counter to the flow direction of the water during the filter operation and can be freed of accumulated particles.

However, the protruding position can also be defined by an abutment, which can be overcome in order to release the particle filter insert from the housing. If the particle filter insert is removed completely from the housing, it is easily accessible from all sides for rinsing purposes.

The abutment which can be overcome can be formed in particular by radially deflectable flexible tongues of the housing.

The particle filter insert preferably has a star-shaped flange at an end that faces the open end of the housing, wherein an inlet opening of the particle filter insert is formed in the middle of the flange and nibs of the flange rest against the housing in the abutment position. After passing through the particle filter insert, water can flow through between the nibs of the flange back to the open end and the one open end of the housing is sufficient to guide water toward the particle filter insert and the filtered water back from the particle filter insert to one of the consumers.

If the housing has a step in its inside, the abutment position can be defined by a contact of the nibs with the step. Thus the tightness of a connection between the inlet opening of the particle filter insert and a supply line of the filter head can be ensured largely independently of possible measuring tolerances of the housing and of the particle filter insert.

If the particle filter insert is guided in a torque-proof manner in the housing, then a protrusion on a side of the flange that faces the open end of the housing rotates if the housing is fixed to the filter head by means of a rotation. The protrusion can then interact with a sensor, in particular a switch, of the filter head, in order to verify, with a closed housing, that this is in a position fixed firmly to the filter head and the particle filter insert is mounted.

The torque-proof guidance of the particle filter insert can be realized in particular by the housing having inwardly protruding, axially extended ribs, between which a protrusion of the particle filter insert engages.

Ends of these ribs can expediently form the radially deflectable flexible tongues mentioned above.

The particle filter insert may comprise a pipe-shaped strainer as well as a head piece and a foot piece, which are molded from plastic to edges of the strainer. The foot piece can comprise the afore-mentioned star-shaped flange. The head piece can form the protrusion that engages between the extended ribs.

The head piece and foot piece can be connected by means of axially oriented webs, in particular to limit a torsion of the strainer if a torque acts between the head and foot piece when the filter cartridge is fixed to the filter head or the fixing is released.

Since during operation the pressure in the inside of the strainer is higher than outside of it, the webs preferably rest the strainer against an exterior.

At least one axially extended rib can be provided on an exterior of the housing in order to facilitate a user with manually exerting the torque required to fix the filter cartridge to the filter head or to release its fixing.

The subject matter of the invention is also a refrigeration appliance, in particular a domestic refrigeration appliance, in which a water connection and at least one water consumer are connected by way of a filter cartridge as described above.

BRIEF DESCRIPTION OF THE SEVERAL VIEWS OF THE DRAWING

Further features and advantages of the invention will become apparent from the description of exemplary embodiments which follows by reference to the appended figures, in which:

FIG. 5 shows an axial section through the filter cartridge mounted on the filter head;

FIG. 6 shows an axial section through the filter cartridge mounted on the filter head along a section plane rotated about the axis compared with FIG. 5; and FIG. 7 shows an axial section through filter cartridge and filter head during disassembly.

DESCRIPTION OF THE INVENTION

Figure 1:
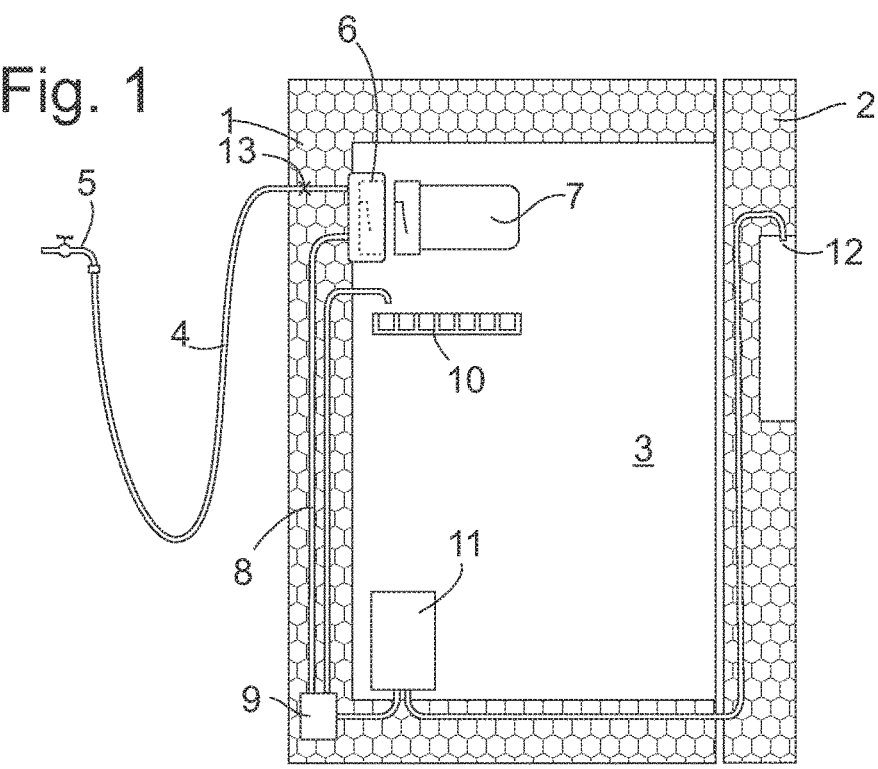
FIG. 1 shows a schematic section through an inventive refrigeration appliance.

The refrigeration appliance in FIG. 1 has a body 1 and a door 2, in a manner known per se, which enclose a heat-insulated interior 3. The interior 3 may be divided into several storage compartments for refrigerated goods, which are kept at different target temperatures during operation.

A water pipe 4 that can be blocked by a magnet valve 13 extends between a tap 5 of a building supply network and a filter head 6 of the refrigeration appliance. The filter head 6 is provided in order to fix a filter cartridge 7 therein; the installation space of the filter cartridge 7 on the filter head 6 may be disposed in the cooled interior 3.

The water pipe 8 extends from the filter head 6 further to a valve assembly 9, in order by way of this, in a manner known per se, to supply an ice maker 10, and/or a tank 11 which is in thermal contact with the interior 3 and a cold water dispenser 12 in a recess of the door 2.

Figure 2:
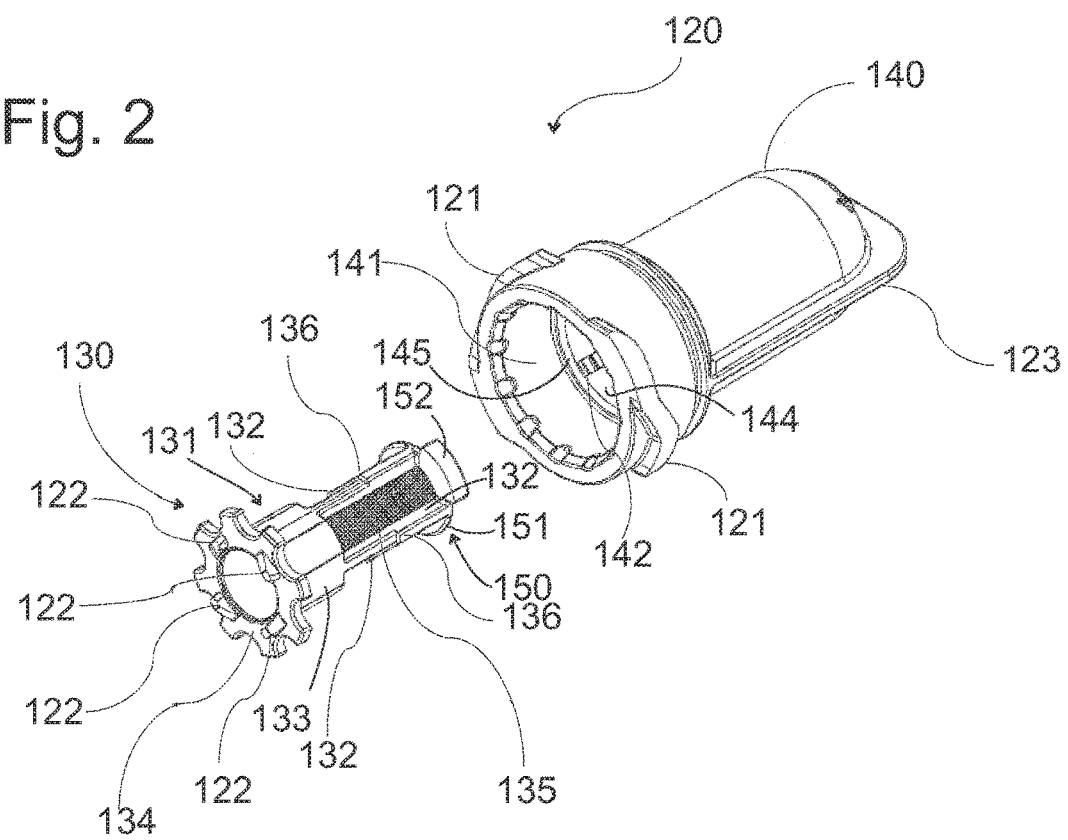
FIG. 2 shows an exploded view of the filter cartridge.

FIG. 2 shows the filter cartridge 7 in an exploded perspective view. It comprises a beaker-shaped housing 120 that is injection-molded in one piece from plastic and a particle filter insert 130. Adjacent to its open end provided to engage into the filter head 6, the housing 120 supports coupling ribs 121 that protrude outward, said coupling ribs forming a bayonet coupling with complementary grooves in the filter head 6. A rib 123 extending in the axial direction of the housing extends in an arc above the part of the housing 120 that faces away from the filter head 6, in order to support the hand of a user and to facilitate the exertion of a torque for closing or releasing the bayonet coupling.

Figure 3:
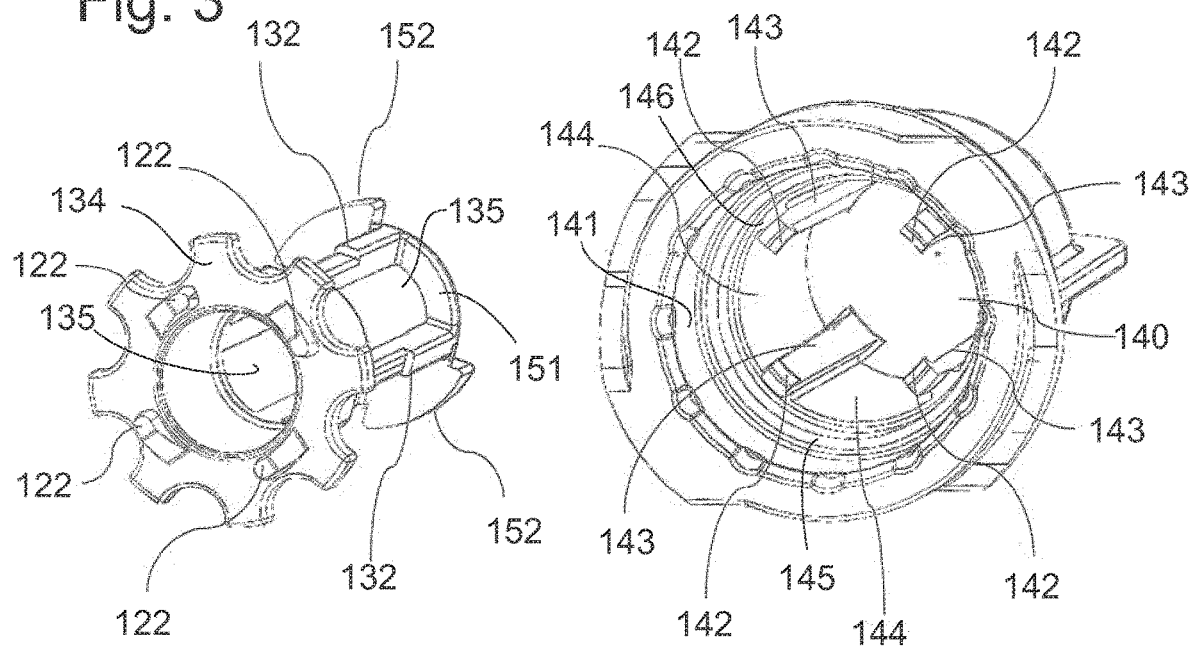
FIG. 3 shows a second exploded view of the filter cartridge.

In the inside of the housing 120 a cylindrical sealing surface 141 firstly connects to the open end and then behind a step 145, a cylindrical inner surface 144, the diameter of which is smaller than that of the sealing surface 141, connects thereto. As is significantly clearer in FIG. 3, four ribs 143 protrude from the inner surface 144 at an angular distance of 90° from one another into the inside of the housing 120. The ribs 143 extend across the entire axial extent of the inner surface 144 from a base 140 and beyond the step 145. A gap is retained between the nibs of the ribs 143 that protrude beyond the step 145 and the sealing surface 141, said gap allowing the nibs to function as flexible tongues 142 and to elastically yield a force directly radially outward and exerted thereon. The flexible tongues 142 each have catches 146 which protrude radially inward in each case (see FIG. 6).

The particle filter insert 130 comprises a fine-mesh strainer 135 molded into a cylinder and a form part made of plastic which is injection-molded in one piece onto the strainer 135. The form part can be subdivided into a head part 150 and a foot part 131, into which edges of the strainer 135, which oppose one another axially in each case, are tightly embedded, and four webs 132 extending in the axial direction between the head and foot part, which rest the strainer 135 against its exterior.

The head part 150 is composed of a circular disk 151, the diameter of which corresponds to the distance of the opposing ribs 143 of the housing 120 and two circular sectors 152, which project in opposite directions beyond the edge of the circular disk 151 and, if the housing 120 and particle filter insert 130 are merged together, engage in a form-locking manner between two adjacent ribs 143 and thus couple the particle filter insert 130 in a torque-proof manner to the housing 120. Outer surfaces of the webs 132 rest on the ribs 143 with a sliding movement.

Figure 4:
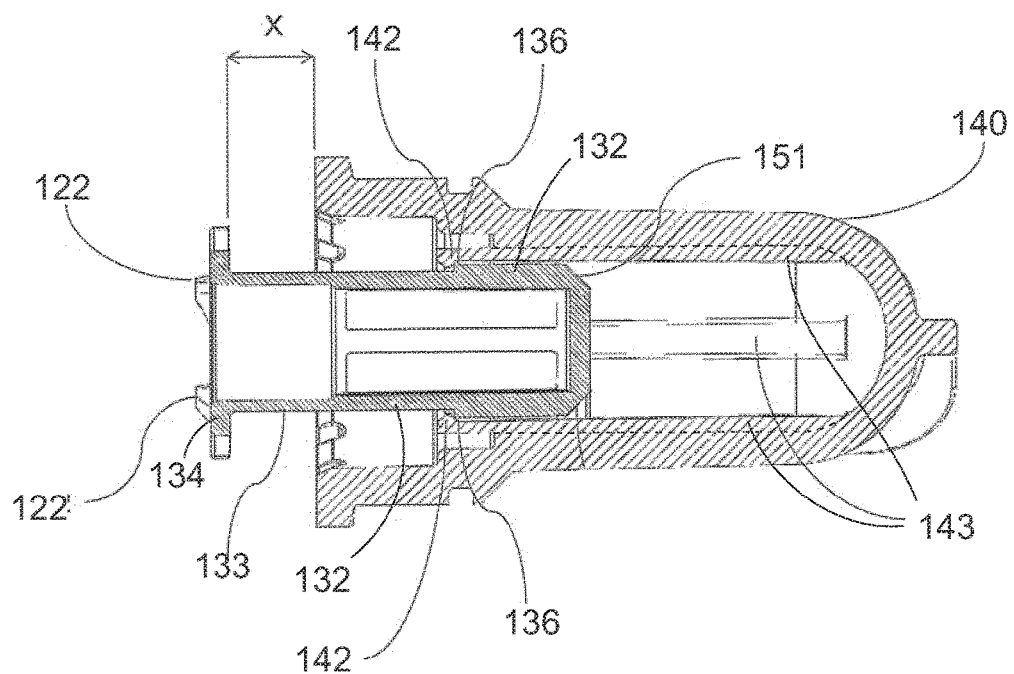
FIG. 4 shows an axial section through the filter cartridge with the particle filter insert in the position protruding partially from the housing.

The foot part 131 comprises a pipe segment 133 which extends in the axial direction along the length of the strainer and a star-shaped flange 134 at the end of the pipe segment 133 that faces away from the strainer 135. On a side facing away from the strainer 135, the flange 134 supports four protrusions 122, each arranged at an angular distance of 90° on a circle. The outer diameter of the flange 134 is marginally smaller than that of the sealing surface, so that in an abutment position of the particle filter insert 130, nibs 135 of the flange 134 can rest against the shoulder 145. By the engagement of the flange 134 into the sealing surface 141 and the engagement of the circular disk 151 between the ribs 143, the particle filter insert 130 is guided in an axial direction between the abutment position and a position that at least partially protrudes from the housing, in which the catches of the nibs 142 each strike against a step 136 of the webs 132. FIG. 4 shows the position of the particle filter insert 130 that protrudes partially from the housing in an axial section.

Figures 5, 6, 7:
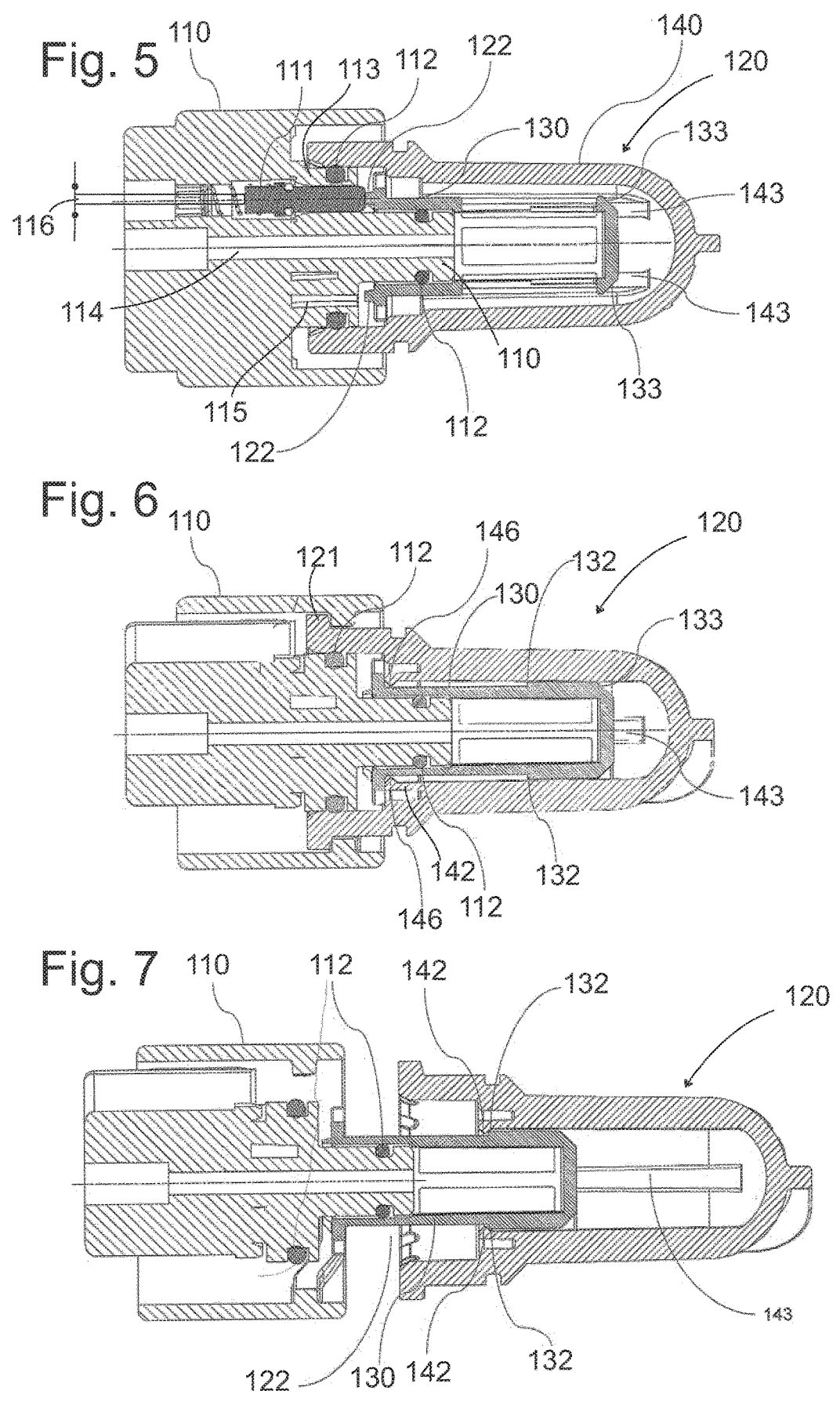

FIG. 5 shows the complete filter cartridge 7, mounted in the filter head 6, in an axial section. An inlet support 110 of the filter head 6 extends through a central passage of the flange 134 until the pipe segment 133 and supports an O-ring 112 that seals the interior of the pipe segment 133. The water pipe 4 opens into the inside of the particle filter insert 130 by way of a central bore 114 of the inlet support 110.

A second, shorter outlet support 113 surrounds the inlet support 110 in a concentric manner and supports a second O-ring 112, which seals the sealing surface 141 of the housing 120. A bore 115 that is only visible to a small degree in FIG. 5 and runs eccentrically through the outlet support 113 forms the start of the water pipe 8.

A spring-loaded tappet 111 holds the particle filter insert 130 in the abutment position with nibs of the flange 134 that rest against the shoulder 145. In the configuration shown here, with an engaged bayonet coupling, the tappet 11 is impressed through one of the protrusions 122 to such a depth that it closes a switch 116. If the housing 120 was not rotated sufficiently far in order to engage the bayonet coupling, then the tappet 111 would not be opposite to the protrusion 122 and the switch 116 would be open. Indeed the switch 116 would also be open if in fact the bayonet coupling is engaged, but the particle filter insert 130 is not mounted. Provided the switch 116 is open, the magnet valve 13 closes and thus prevents more water than is currently contained in the housing 120 from running out of the filter head 6 when the filter cartridge 7 is released.

If the magnet valve 13 is closed, water can flow from the bore 114 through the strainer 135, wherein particles which are carried along remain in the particle filter insert 130 and pass through an intermediate space between the particle filter insert 130 and the inner surface 144 and through holes 136 between the nibs of the flange 134 to the bore 115.

Like FIG. 5, FIG. 6 shows an axial section through the filter cartridge 7 fixed to the filter head 6 with an engaged bayonet coupling, nevertheless in a plane, which, as in FIG. 4, runs through two opposing ribs 143 of the housing 120. It is clearly apparent that the webs 132 each oppose the ribs 143 at a minimal distance on a side of the shoulders 136 that faces away from the flange 134, while a gap between the webs 132 and ribs 143 is present between the shoulders and the flange 134, into which gap the catches on the nips 142 of the ribs 143 engage, and the length of which defines the freedom of movement of the particle filter insert 130 between the abutment position embedded in the housing 120 and the position protruding from the housing 120.

FIG. 7 in turn shows an axial section through the filter cartridge 7 and the filter head 6 after releasing the bayonet coupling. The housing 120 of the filter cartridge 7 is removed from the outlet support 113; the particle filter insert 130 is disposed in a frictionally fixed manner by the O-ring 112 of the inlet support 110, in the position protruding from the housing 120. By further pulling on the housing 120, the particle filter insert 130 is also separated from the inlet support 110. If the user now grips the particle filter insert 130 on its flange 134, and pulls thereon, the shoulders 136 press the nibs 142 radially outward, the particle filter insert 130 comes free. Particles retained in the particle filter insert 130 can now be flushed out Finally the particle filter insert 130 and housing 120 are merged together again and the filter cartridge 7 is mounted in the filter head 6 again.

REFERENCE CHARACTERS

1 Body
2 Door
3 Interior
4 Water pipe
5 Tap
6 Filter head
7 Filter cartridge
8 Water pipe
9 Valve assembly
10 Ice maker
11 Tank
12 Cold water dispenser
13 Magnet valve
110 Inlet support
111 Tappet
112 O-ring
113 Outlet support
114 Bore
115 Bore
116 Switch
120 Housing
121 Coupling rib
122 Protrusion
123 Rib
130 Particle filter insert
131 Foot part
132 Web
133 Pipe segment
134 Flange
135 Strainer
136 Step
140 Base
141 Sealing surface
142 Nib
143 Rib
144 Inner surface
145 Step
146 Catch
150 Head part
151 Circular disk
152 Circular sector

The invention claimed is:

1. A filter cartridge, comprising:
a beaker-shaped housing having an axis and an open end;
said housing having a coupling disposed on an outside diameter of said housing at said open end of said housing for securing the filter cartridge to a filter head; and
a particle filter insert including a head, a foot, and a cylindrical mesh strainer having a first longitudinal edge embedded in said head and a second longitudinal edge embedded in said foot, said particle filter insert including longitudinally extending webs disposed on an exterior of said mesh strainer and extending from said head to said foot, said particle filter insert received in said housing, said particle filter insert being guided movably along said axis of said housing between an abutment position in which said particle filter insert is embedded completely in said housing and a position in which said particle filter insert at least partially protrudes from said housing.

2. The filter cartridge according to claim 1, wherein said particle filter insert is beaker-shaped.

3. The filter cartridge according to claim 1, wherein:
said particle filter insert has an end facing said open end of said housing;
said particle filter insert has a star-shaped flange at said end of said particle filter insert facing said open end of said housing;
said particle filter insert has an inlet opening formed centrally in said flange; and
said flange has nibs resting against said housing in said abutment position.

4. The filter cartridge according to claim 3, wherein said housing has a step, and said abutment position is defined by contact of said nibs of said flange with said step.

5. The filter cartridge according to claim 3, wherein said particle filter insert is constructed to be guided in a torque-proof manner in said housing, and said flange supports at least one protrusion on a side of said flange facing said open end of said housing.

6. The filter cartridge according to claim 5, wherein said particle filter insert has a protrusion, and said housing has inwardly protruding, axially extending ribs between which said protrusion of said particle filter insert engages.

7. The filter cartridge according to claim 1, wherein said housing has an exterior and at least one axially extending rib disposed at said exterior.

8. A refrigeration appliance or domestic refrigeration appliance, comprising:
a water connection;
at least one water consumer; and
a filter cartridge according to claim 1 interconnecting said water connection and said water consumer.

9. The filter cartridge according to claim 1, wherein said housing has longitudinally extending ribs on an inside diameter thereof.

10. The filter cartridge according to claim 9, wherein said head part has a circular disk with a diameter corresponding to a distance between opposing ones of said ribs, said disk having two circular segments that project beyond an edge of said circular disk for engaging between adjacent ribs of said ribs.

11. A filter cartridge, comprising:

a beaker-shaped housing having an axis and an open end, said housing having a nib;

a coupling disposed at said open end of said housing for securing the filter cartridge to a filter head;

a particle filter insert including a mesh cylinder with a longitudinally extending web on an outer side of said mesh cylinder, said particle filter insert being received in said housing, said particle filter insert being guided movably along said axis of said housing between an abutment position in which said particle filter insert is embedded completely in said housing and a position in which said particle filter insert at least partially protrudes from said housing;

an abutment defining said position in which said particle filter insert at least partially protrudes from said housing, said web defining a step that engages said nib for defining said abutment, said particle filter insert being released from said housing by overcoming said abutment.

12. The filter cartridge according to claim 11, wherein said abutment is formed by radially deflectable flexible tongues of said housing.

\* \* \* \* \*